March 8, 1966  R. S. HOWE, JR., ETAL  3,239,292
LOCKING COLLAR FOR BEARINGS
Filed May 1, 1963
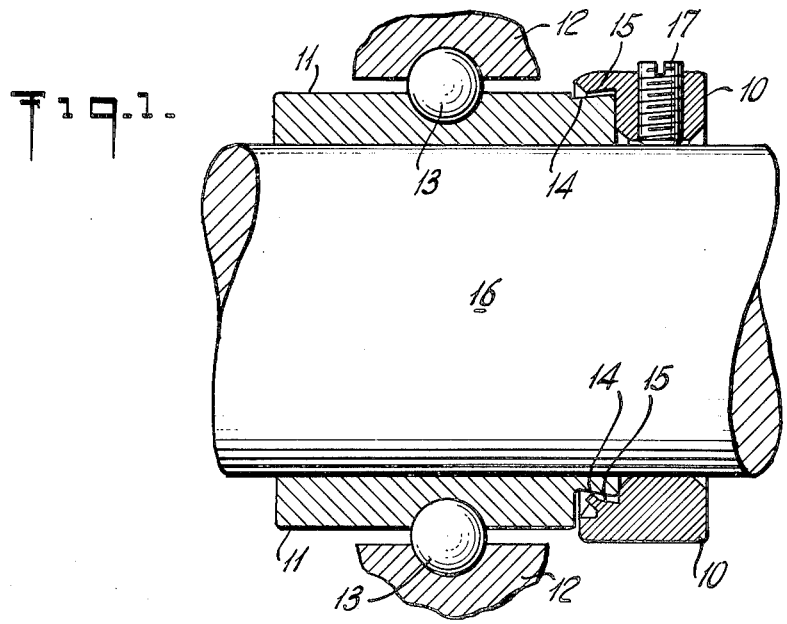
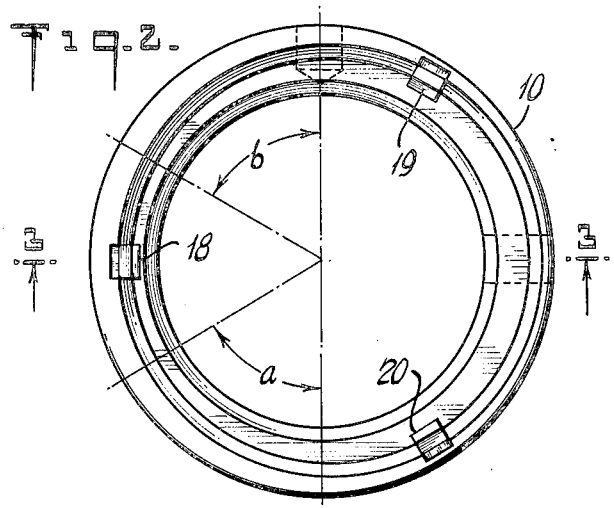
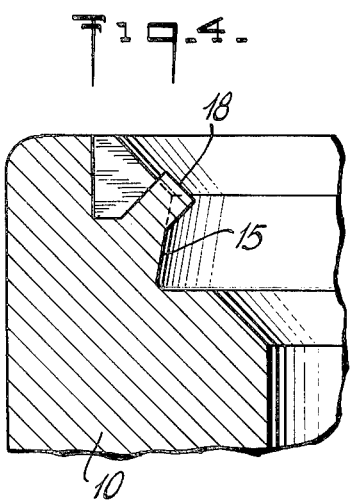
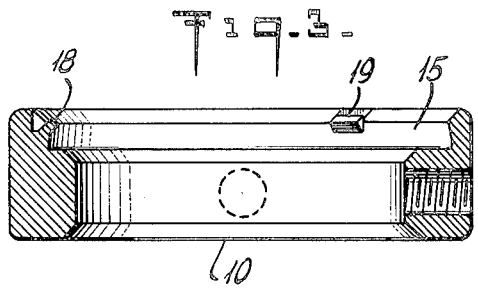
INVENTORS
RALPH S. HOWE JR.
ROGER W. PARKINSON
BY *Hoppgood & Calimafde*
ATTORNEY

United States Patent Office 3,239,292
Patented Mar. 8, 1966

3,239,292
LOCKING COLLAR FOR BEARINGS
Ralph S. Howe, Jr., New Britain, and Roger W. Parkinson, Plainville, Conn., assignors to The Fafnir Bearing Company, New Britain, Conn., a corporation of Connecticut
Filed May 1, 1963, Ser. No. 277,243
5 Claims. (Cl. 308—236)

This invention relates to a locking collar for locking the inner ring of an anti-friction bearing to a shaft. More specifically, this invention is an improvement in eccentric locking collar means such as disclosed in U.S. Patents No. 2,728,616; 2,718,415; 2,665,930; and 2,719,046.

Eccentric locking collar means per se are well known in the art, but in the past these locking collars have suffered from the disadvantage of being separate from the bearings that they lock. Therefore, it was possible for the locking collars to become separated from their bearings, and it was also possible for the bearing to be mounted on a shaft without its locking collar, thereby producing a defective bearing-shaft assembly.

Accordingly, one object of this invention is to provide an integral bearing-locking collar assembly in which the locking collar is attached to the bearing.

Another object of this invention is to provide a novel means of attaching a locking collar to a bearing assembly.

Other objects and advantages of the invention will be apparent to those skilled in the art from the following description of one specific embodiment of the invention, as illustrated in the annexed drawings, in which:

FIG. 1 is an elevation section of one specific embodiment of the invention;

FIG. 2 is a plan view of the locking collar shown in FIG. 1;

FIG. 3 is an elevation section taken on the line 3—3 of FIG. 2; and

FIG. 4 is an enlarged section of the corner portion of FIG. 3.

Referring to the drawings, one embodiment of the invention comprises an eccentric locking collar 10 which is adapted to fit over the inner ring 11 of an antifriction bearing containing an outer ring 12 and antifriction bearing members such as balls 13 communicating between the inner and outer rings. An eccentric surface 14 is formed on one end of inner ring 11 and a matching eccentric surface 15 is formed on one end of locking collar 10. The eccentric surfaces 14 and 15 are designed to fit each other, and when both are in place on a shaft 16, the inner ring 11 can be locked in place quite securely by simply rotating the locking collar 10 relative to the inner ring 11. A set screw 17 is provided to secure the locking collar and inner ring against axial movement on the shaft, and also for holding the locking collar against rotation so that the collar and inner ring may be rotated readily relative to each other. As thus far described, this embodiment of the invention is similar to the prior art eccentric locking collars and operates in accordance with the principles described in the above noted U.S. Patents No. 2,728,616; 2,718,415; 2,665,930; and 2,719,046.

The novel portions of this embodiment comprise three simple nibs 18, 19, and 20 which are staked into eccentric surface 15, as shown in FIGS. 2, 3, and 4. Nibs 18, 19, and 20 serve to hold locking collar 10 onto innner ring 11 without interfering with the locking action of the collar. This is accomplished by locating the nibs outside of the collar locking zones, which are indicated in FIG. 2 by arcs $a$ and $b$. The collar locking zones are the zones of pressure contact between the collar and the shaft in the locked condition. This particular embodiment of the invention utilizes three nibs which are spaced at 120° angular increments with one of the nibs (nib 18) located at the widest portion of the eccentric surface. The nibs project innward of eccentric surface 15 by .025 inch in this particular embodiment, and the collar 10 can be fitted onto inner ring 11 by either applying light impact pressure to "pop" the stakes over the inner cam ring or by tilting the collar slightly and engaging one of the nibs in the bottom of tapered cam surface 14, which then provides enough clearance to slide the other two nibs over cam surface 14. After collar 10 has been "popped" or fitted onto inner ring 11, the two pieces remain fastened together under normal handling because the particular impact pressure or tilt required for disassembly is unlikely to occur by accident. If it is necessary to have the two pieces remain together under all conditions, however, the nibs can always be expanded slightly after the two pieces are assembled, or they can be formed after the two pieces are assembled. The nibs can be formed most easily by staking, since the collar 10 is usually made of soft metal for greater locking effectiveness, but any suitable forming method can be used.

From the foregoing description it will be apparent that this invention provides a unitary bearing-locking collar assembly and also that this invention provides a novel method of fastening a locking collar to a bearing. And it should be understood that this invention is by no means limited to the specific embodiments disclosed herein, since many modifications can be made in the structure disclosed without departing from the basic teaching of this invention. For example, the nibs might be circular in shape rather than rectangular as shown, and they could be formed by many methods other than staking. These and many other modifications will be apparent to those skilled in the art.

What is claimed is:

1. In a shaft-mounted antifriction bearing containing inner and outer bearing rings with interposed antifriction bearing members and a circumferentially extending locking cam projecting axially from one end of said inner bearing ring, the improvement comprising a locking collar having an eccentric cam surface adapted to fit over and interact with said locking cam, and a plurality of nibs projecting inwardly from said cam surface to secure said locking collar to said inner bearing ring, said nibs being located at spaced circumferential positions on said cam surface.

2. The combination defined in claim 1 in which said nibs are located outside of the locking zones of said locking collar.

3. The combination defined in claim 2 in which said nibs are three in number and spaced from each other by 120° of arc around the circumference of said cam surface.

4. The combination defined in claim 3 in which said nibs are formed by staking.

5. The combination defined in claim 3 which further includes a set screw for securing said locking collar and inner ring against axial movement on said shaft.

References Cited by the Examiner
UNITED STATES PATENTS

| | | | |
|---|---|---|---|
| 1,454,890 | 5/1923 | Harpe | 287—137 |
| 1,519,166 | 12/1924 | Rauch | 308—161 |
| 2,457,472 | 12/1948 | Hufferd et al. | |
| 2,718,415 | 9/1955 | Reynolds | 308—236 |

DAVID J. WILLIAMOWSKY, Primary Examiner.

FRANK SUSKO, Examiner.